(12) United States Patent
Romanenko et al.

(10) Patent No.: US 11,557,185 B2
(45) Date of Patent: Jan. 17, 2023

(54) IMAGE PROCESSING METHOD

(71) Applicant: Apical Ltd, Cambridge (GB)

(72) Inventors: Ilya Romanenko, Cambridge (GB); Michael Tusch, Cambridge (GB)

(73) Assignee: ARM Limited, Cambridge (GB)

( * ) Notice: Subject to any disclaimer, the term of this patent is extended or adjusted under 35 U.S.C. 154(b) by 417 days.

(21) Appl. No.: 15/807,477

(22) Filed: Nov. 8, 2017

(65) Prior Publication Data
US 2018/0068540 A1 Mar. 8, 2018

Related U.S. Application Data

(63) Continuation of application No. PCT/GB2016/051362, filed on May 12, 2016.

(30) Foreign Application Priority Data

May 12, 2015 (GB) .................................. 1508074

(51) Int. Cl.
*G06V 10/25* (2022.01)
*G06V 20/40* (2022.01)
(Continued)

(52) U.S. Cl.
CPC ....... *G08B 13/19602* (2013.01); *G06V 10/25* (2022.01); *G06V 20/41* (2022.01);
(Continued)

(58) Field of Classification Search
CPC ........ G08B 13/19602; G08B 13/19656; G08B 13/19667; G06K 9/3233; G06K 9/00228; G06K 9/00718; G06K 9/00771; G06K 9/00362; G06K 2009/00738; G06K 9/00221; H04N 7/183; H04N 19/167; H04N 19/137; H04N 7/18; H04N 19/124;
(Continued)

(56) References Cited

U.S. PATENT DOCUMENTS 8,331,616 B2 * 12/2012 Sabe .................... G06V 40/165
382/103
9,041,766 B1 * 5/2015 Gates ...................... H04N 7/15
348/14.08

(Continued)

FOREIGN PATENT DOCUMENTS

WO 9953686 A1 10/1999
WO 2012033758 A2 3/2012

OTHER PUBLICATIONS

International Search Report and Written Opinion dated Sep. 2, 2016 for PCT Application No. PCT/GB2016/051362.

*Primary Examiner* — Amandeep Saini
(74) *Attorney, Agent, or Firm* — EIP US LLP

(57) ABSTRACT

An image processing method is provided. The method includes acquiring a video. The method includes using an object detection engine to detect a person in the video. The object detection engine is integrated with an image signal processing pipeline. The method includes transmitting the video over a network. The method includes determining that the detected person has moved less than a pre-set distance. The method includes, responsive to the determining, pausing transmission of the video. An embedded image processor including an object detection engine is also provided.

15 Claims, 4 Drawing Sheets

Preserved critical area

(51) Int. Cl.
*G06V 20/52* (2022.01)
*G06V 40/10* (2022.01)
*G06V 40/16* (2022.01)
*G08B 13/196* (2006.01)
*H04N 19/117* (2014.01)
*H04N 19/87* (2014.01)
*H04N 19/142* (2014.01)
*H04N 19/503* (2014.01)
*H04N 19/124* (2014.01)
*H04N 19/137* (2014.01)
*H04N 19/172* (2014.01)
*H04N 7/18* (2006.01)
*H04N 19/115* (2014.01)
*H04N 19/167* (2014.01)

(52) U.S. Cl.
CPC .............. *G06V 20/52* (2022.01); *G06V 40/10* (2022.01); *G06V 40/161* (2022.01); *G08B 13/19656* (2013.01); *G08B 13/19667* (2013.01); *H04N 7/18* (2013.01); *H04N 7/183* (2013.01); *H04N 19/115* (2014.11); *H04N 19/117* (2014.11); *H04N 19/124* (2014.11); *H04N 19/137* (2014.11); *H04N 19/142* (2014.11); *H04N 19/167* (2014.11); *H04N 19/172* (2014.11); *H04N 19/503* (2014.11); *H04N 19/87* (2014.11); *G06V 20/44* (2022.01); *G06V 40/16* (2022.01)

(58) Field of Classification Search
CPC .... H04N 19/87; H04N 19/115; H04N 19/117; H04N 19/172; H04N 19/142; H04N 19/503; H04N 5/14; G06V 10/25; G06V 20/41; G06V 20/52; G06V 40/10; G06V 40/161; G06V 20/44; G06V 40/16; G06T 7/00; G06T 7/20
USPC ........................................................ 382/103
See application file for complete search history.

(56) References Cited

U.S. PATENT DOCUMENTS

| | | | |
|---|---|---|---|
| 2007/0182540 A1* | 8/2007 | Marman | G06V 20/52 340/541 |
| 2007/0223812 A1 | 9/2007 | Ito | |
| 2008/0013787 A1 | 1/2008 | Kobayashi | |
| 2009/0195382 A1* | 8/2009 | Hall | G08B 13/19663 340/541 |
| 2010/0119157 A1 | 5/2010 | Kameyama | |
| 2012/0062732 A1* | 3/2012 | Marman | H04N 7/18 348/142 |
| 2015/0161882 A1* | 6/2015 | Lett | G08B 25/001 340/506 |
| 2015/0181314 A1* | 6/2015 | Swanson | G16H 20/30 340/870.07 |
| 2015/0226829 A1* | 8/2015 | Haraguchi | H04N 7/183 348/169 |
| 2016/0100304 A1* | 4/2016 | Kim | H04W 8/005 370/328 |
| 2016/0203370 A1* | 7/2016 | Child | G08B 13/19656 348/143 |

* cited by examiner

IMAGE PROCESSING METHOD

CROSS-REFERENCE TO RELATED APPLICATIONS

This application is a continuation of International Application No. PCT/GB2016/051362, filed May 12, 2016, which claims priority to GB Application No. 1508074.0, filed May 12, 2015, under 35 U.S.C. § 119(a). Each of the above-referenced patent applications is incorporated by reference in its entirety.

BACKGROUND

Field of the Disclosure

The field of the disclosure relates to method of image processing and to related systems, devices and computer program products.

A portion of this disclosure contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Description of the Related Technology

The introduction and proliferation of low cost, high resolution video cameras are major factors in the rapid growth of the home security market. Typical installations now combine multiple Internet Protocol (IP) cameras in and around the home with both video recording solutions and with internet based "home monitoring" services.

However, despite modern techniques of video compression, even homes with multi-gigabit internet connections can easily exhaust their total bandwidth with even a modest number of cameras, perhaps even just one. In the light of growing resolution of IP cameras, i.e. switching to 4 k standard, the issue of bandwidth does not seem to be resolved in a nearest future only by improvements in video encoding techniques.

There is no doubt that such systems can reassure people that their home is safe whilst they are away, and web based monitoring services can text or email when "alarms" are triggered, such as when motion is detected. However, the high incidence of false alarms, and the wasteful use of network bandwidth to, say, connect your camera video phone to your phone app and transmit still and video images, severely limits the useful application of these systems.

DISCUSSION OF RELATED ART

FIG. 1 shows a diagram of typical current systems, in which an IP camera comprises an image sensor, an Image Signal Processor (ISP) and an encoder. Such systems necessarily stream compressed video, primarily around the home network to a storage device, essentially a video recorder. Additionally, some systems may "broadcast" video either directly to a device connected directly via the Internet, or through a web based service—perhaps providing some formatting operations such as scaling the video to a resolution more suited to display on a mobile device.

Such systems may use methods to limit the "on" time of the video, such as using PR motion detectors to trigger recording. However, such systems are both prone to error, necessarily needing the decision to be "over prudent", and the result remains a hard decision; to send video or not.

Additionally, there is a need for a method to reduce the bandwidth requirement through the transmission and at the storage end while preserving critical information in the image or video captured, while at the same time recording certain regions in the image at best possible quality.

SUMMARY

According to some embodiments, an image processing method is provided. The method includes acquiring a video. The method includes using an object detection engine to detect a person in the video. The object detection engine is integrated with an image signal processing pipeline. The method includes transmitting the video over a network. The method includes determining that the detected person has moved less than a pre-set distance. The method includes, responsive to the determining, pausing transmission of the video.

According to some embodiments, an embedded image processor is provided. The embedded image processor includes an object detection engine. The embedded image processor is configured to acquire a video. The embedded image processor is configured to acquire a video. The embedded image processor is configured to use the object detection engine to detect a person in the video, the object detection engine being integrated with an image signal processing pipeline. The embedded image processor is configured to transmit the video over a network. The embedded image processor is configured to determine that the detected person has moved less than a pre-set distance. The embedded image processor is configured to, responsive to the determining, pause transmission of the video.

DETAILED DESCRIPTION

Figure 1:
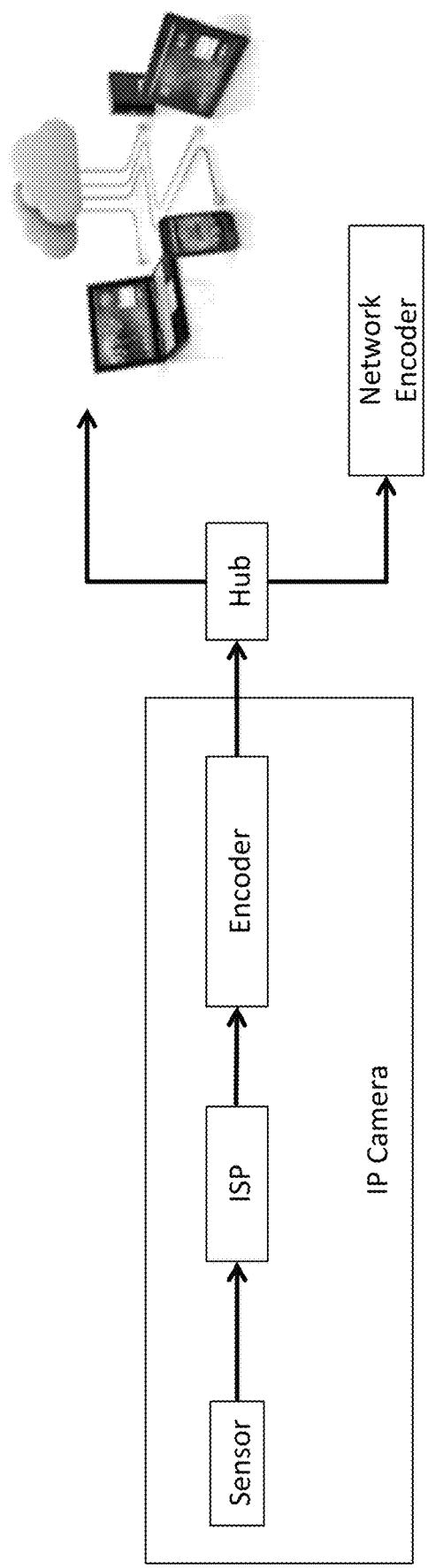
FIG. 1 shows a typical current system.

The present disclosure addresses the limitations of current systems through a novel use of people or object detection results, avoiding false alarms and providing a means to efficiently manage data bandwidth. The disclosure provides a system enabling an efficient use of communication bandwidth and storage.

The present disclosure describes at least an image processing method comprising the steps of acquiring a video and then altering the video, using an object detection engine integrated with an image signal processing pipeline, prior to transmission of the video, in order to modify the bandwidth needed to transmit the modified video or the storage needed to store the video.

Some embodiments include optional features, which may include any one or more of the following. The object detection engine is integrated with the image signal processing pipeline in an embedded image processor. The object detection engine receives raw digital video from an image sensor and analyses the raw digital video on a frame by frame basis. the object detection engine is used to detect a predefined class of object, such as a person. The object detection engine outputs location data or coordinates of one or more persons, body parts such as torso, upper bodies, faces, hands, legs at each video frame. Video transmission is paused when it is determined that detected person(s) have not moved more than a pre-set distance. Detailed object information is used to precisely model the object's avatar to allow the object to be separated from the background more precisely.

Altering the video involves one or more of the following: zooming or cropping into a region of interest or an object of interest; segmenting the video to separate certain object(s) from the background; blurring to remove background details; using a low pass-filter to remove certain areas, such as background details; pastelizing to remove certain areas, such as background details; preserving details such as resolution, texture or color of a region of interest or an object of interest; enhancing details, such as applying localized gamma correction, enhancing contrast or sharpening on a region of interest or an object of interest; altering the video is performed prior to transmitting the video to an encoder that is internal to the camera that recorded the video; the encoder compresses the altered video by taking into account the output(s) of the object detection engine; the encoder compresses the altered video on a frame by frame basis by modifying one or more of the following: compression ratio, quantization, output resolution or frame rate; bandwidth usage is monitored and compression techniques of the encoder are adapted according to the bandwidth usage; an end user is able to modify compression techniques of the encoder remotely; one or more regions of interest in a scene are pre-defined, and bandwidth usage is also pre-defined specifically for each region of interest; a composition or compression target is pre-defined based on a specific scene; the video composition or compression target involves zooming to a person's face when they are the only person in the scene and applying background blurring when there are multiple people and the field of view is preserved; extracting thumbnail images, such as of a person's face, and broadcasting or recording the thumbnail images instead of video; extracting a thumbnail image, such as a person's face, and sending a text alert with the thumbnail to an end user, wherein the end user can choose to access a live video feed; detecting if a person is approaching or leaving, and in which any detected person who is leaving is ignored from a video composition or compression target; detecting an "allowed person" and not sending an alert to the end user; sending annotation data (or subset thereof) to a central hub for aggregating the annotation data from the detections; the video transmitted is interspersed with or includes data to allow an "always on" view, wherein data is one or more of the following: live video, periodic low frame rate video, stills or textual/graphic information; a symbolic/graphical representation of a scene is transmitted instead of video; the symbolic/graphical representation of a scene includes avatars; the method is applied to a multiple camera system, and in which the altered videos from the multiple camera system are used to reconstruct a single multiple camera view that is transmitted to an end-user; defining a set of rules to trigger recording or streaming of video based on events detected on the multiple camera system.

Another aspect is a computer vision system comprising: an image sensor to capture a raw digital video in a visual, or infra-red part of the spectrum; an object detection engine for detecting an object within the captured video and for extracting information on the captured video; an image signal processor to alter the captured video by taking into account the information extracted by the object detection engine; an encoder for compressing the altered video by taking into account the information extracted by the object detection engine.

The computer vision system processes video using the method defined above. The image sensor can also capture 3D depth information.

One or more computer vision system may be embedded in one of the following: IP Camera or webcam; a smartphone; a surveillance computer vision system; autonomous vehicle computer vision system; robotics computer vision system.

Another aspect is an embedded image processor configured for acquiring a video and then altering the video, using an object detection engine integrated with an image signal processing pipeline, prior to transmission of the video, in order to modify the bandwidth needed to transmit the modified video or the storage needed to store the video. The object detection engine and image signal processing pipeline may be integrated with or form part of a GPU (graphics processing unit) or a SoC (system on chip).

Note that the term 'video' used in this specification includes still images.

A video or still camera is provided including an object detection engine for detecting a predefined class of object in an image and for manipulating the image to preserve detail and information necessary to the given application of the camera, whilst reducing the overall bandwidth to transmit, or capacity to store, that image or video.

Integrating an object detection engine with the image signal processing (ISP) pipeline of the camera, that is the processing that is done to convert the output of a CMOS image sensor into a recognizable picture, offers many advantages. The output of an object detection engine is used to control the parameters of the encoder.

ISPs typically already include scalers to crop and resize images, filters to blur images, and noise reduction technologies that can be applied more or less significantly to areas of the image. However, it is also possible to use the results of the people detection engine, such as "annotation data" to control the parameters of the encoder.

Figure 2:
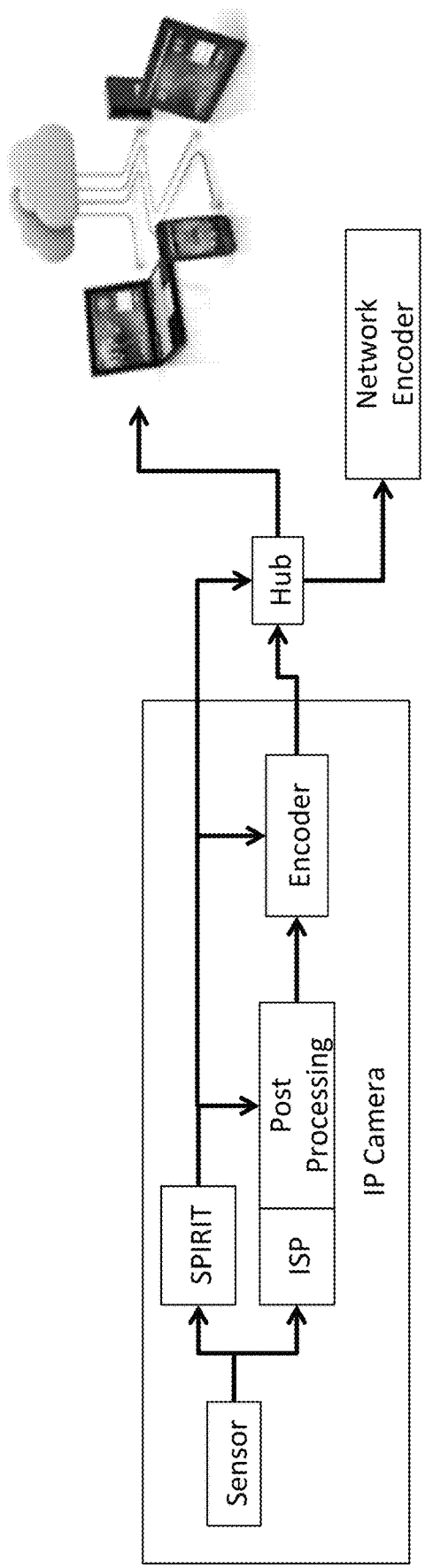
FIG. 2 shows the system architecture of the present disclosure, according to some example embodiments.

FIG. 2 shows a diagram of the system's architecture. An IP camera comprises an image sensor for capturing an image data, an object detection engine (SPIRIT) for detecting an object within the captured image data, an image signal processor including a post processing module for processing the captured image by taking into account the object detection engine output, and an encoder for compressing the processed image by taking into account the detection engine output. The system adopts advanced detection techniques not only as a trigger, but also as a means to modify and manage the video transition bandwidth (not excluding still images) in a graceful, predictable manner, without the loss of critical information. The proposed system may for example employ a people detection engine, in this case referred to as the "SPIRIT" engine, to extract the coordinates of people and their faces within each video frame. Since the detection is done within the camera, the video can be manipulated prior to transmission. In fact the video may be modified, such as scaled or cropped, even before compression.

One implementation of the disclosure is a video or still camera including a means to detect a predefined class of object in an image and manipulate that image to preserve detail and information necessary for a specific application, whilst reducing the overall bandwidth needed to transmit image or video, or the capacity to store that image or video.

Optional implementations may include the following features, alone or in combination. Image or video data sent to an encoder may be modified according to one or more of the following: determine that whilst people have been detected, but have not moved more than a pre-set distance, then pause the output, thereby exploiting the temporal compression of the encoder (this results in on the fly frame rate control); zoom to the region of interest, for instance a person; segmentation of scene to separate people from background; blur/low-pass filter/pastelize . . . remove detail of background; preserve detail of faces (including resolution, texture, color); enhance detail—application of localized gamma correction, contrast enhancement, sharpening . . . of critical areas like faces. Modifying the behavior of the encoder may include for example: compression ratio; quantization; output resolution and/or frame rate. The system may be augmented by a means to monitor the usage of bandwidth, and further to adopt more or less aggressive compression techniques as described above. The system may include a means for the end user (consumer) of the video to request greater/lesser compression, remotely. The system may include a means for the end user (consumer) of the video to alter the compression strategy. The system may be augmented by a means to define different regions of interest in a scene, such that greater bandwidth may be dedicated to video relating to that region (note: for instance, higher bandwidth at front door, lower for further away). The system may comprise different strategies for compression based on the scene, including zooming in to a person's face when they are the only person in the scene, and applying greater background blurring when there are multiple people and the field of view is preserved. The system may extract thumbnail images, say of faces, and broadcast/record these in favor of video. This includes sending a text alert—so user can see a thumbnail, if they recognize the person then do nothing, but if not, they can click on it to go to the live video feed. The system may determine if someone is approaching or leaving, and may include rules to ignore people leaving. The system may recognize people, including "rules" to define them as an "allowed" person—so no need to send anything. The system may send annotation data (or subset thereof) to a central hub to allow the aggregation of detections. A multi-camera system may be augmented with a web-based service that can take the compressed/cropped/thumbnails from several cameras and construct (on the fly) a single multi-camera view to transmit to the user (saving bandwidth/data usage) on the receiving device. A multi-camera system/hub may include rules to be defined to trigger recording or streaming of video based on events detected on multiple cameras (like—camera 1 saw someone in the yard, camera 2 saw them approach the back door . . . ). The system may include an application/program/browser, characterized in that the received video is interspersed with/includes (or through any other channel) data to allow an "always on" view, which may be live video, periodic low frame rate vide, stills or textual/graphic information. The "compressed video" may be replaced altogether by a symbolic/graphical representation of the scene, including sending this as data to be rendered by a "player" (so this is not video). The symbolic/graphical representation of the scene may also add real faces to avatars. The system may be performed in real-time. Modifying or altering the video is performed in 3D.

Figure 3:
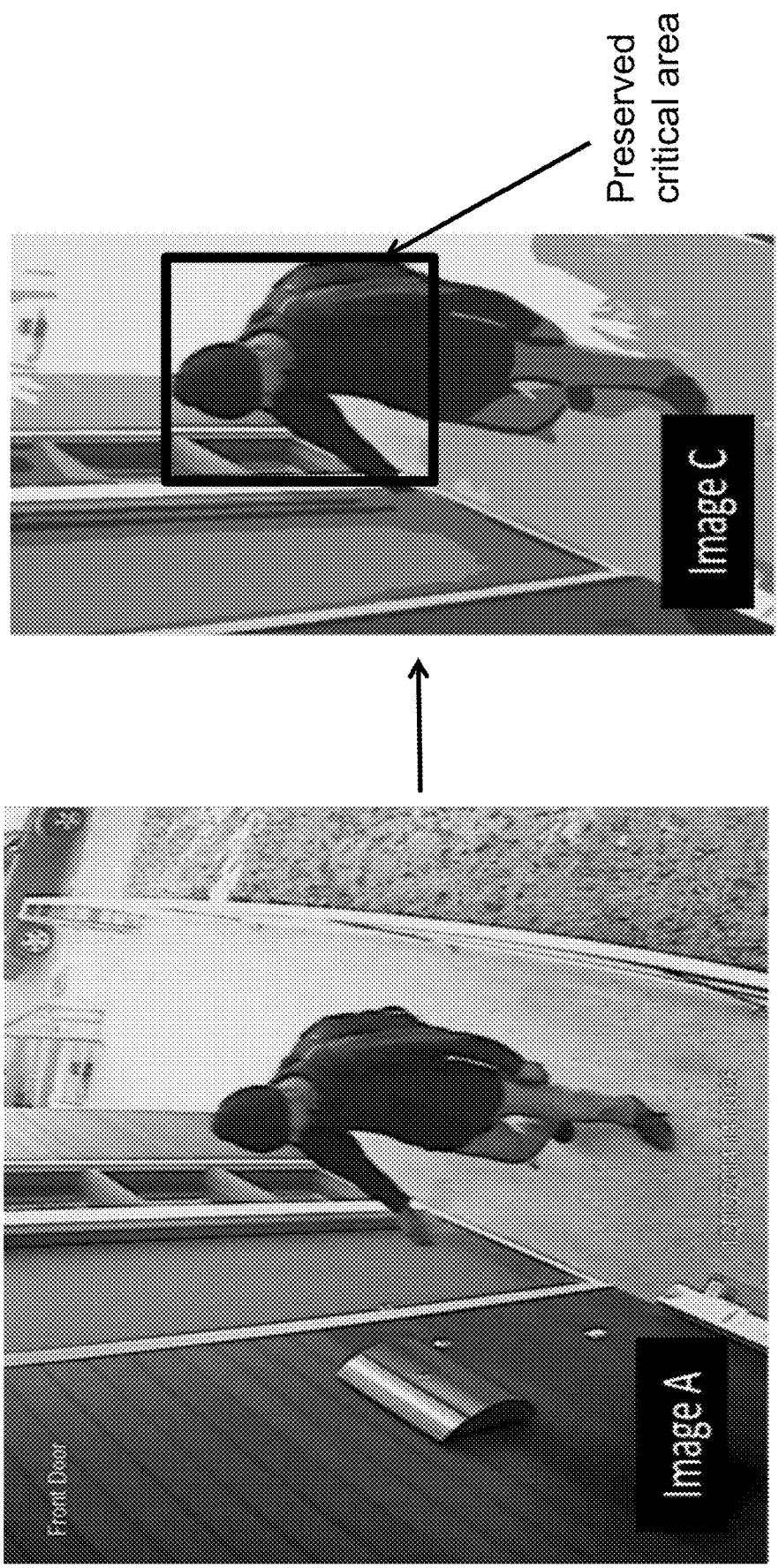
FIG. 3 shows an example of a system for people detection in which a security camera is placed outside an entry door, according to some example embodiments.

FIG. 3 shows an example of a system for people detection in which a security camera is placed outside an entry door. The system prevents false alarms due to passing traffic, such as a car present in background. Image A shows the original video captured by the camera. In order to save bandwidth, the image may be cropped. Cropping the image also further reduces the likelihood of any motion in the scene such as passers by being included in the scene and hence may also reduce the number of false alarms. Other example of cropped background information also includes plants blowing in the wind or flapping leaves in the background. The system therefore enables to take advantage of the motion estimation based compression in the encoder. Image C shows a processed image to be recorded or broadcasted, in which the person's head has been segmented from the background scene, allowing detail to be preserved in critical areas, such as the person's face. The rest of the image (background) has been blurred, allowing Image C to be more efficiently compressed.

Figure 4:
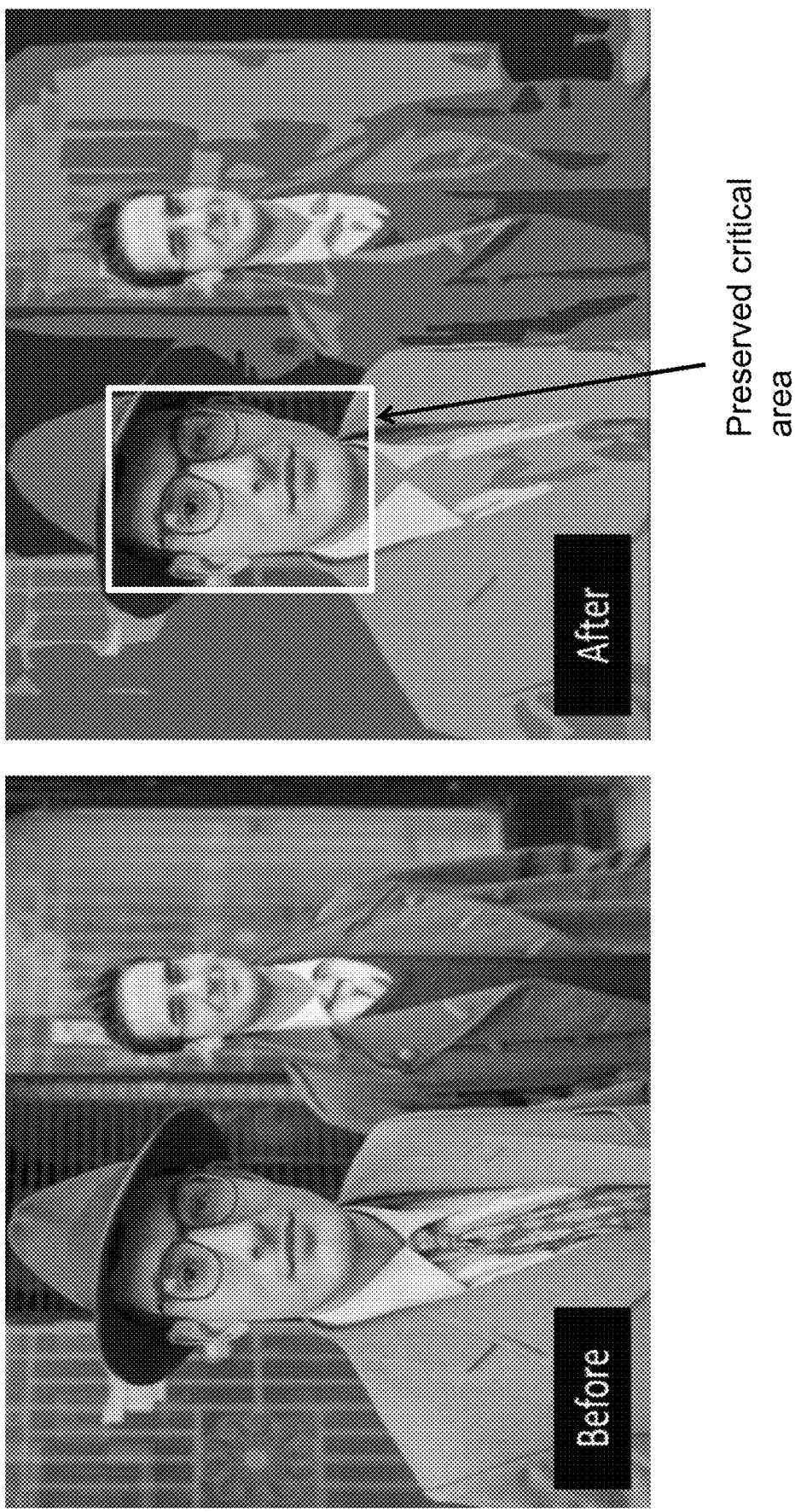
FIG. 4 shows another example of a system for people detection, according to some example embodiments.

FIG. 4 shows another example of a system for people detection and demonstrates how the proposed techniques, whilst dramatically altering the image to vastly increase the achievable compression, still retains the "useful" information required by the observer. FIG. 4 shows a "before" image as captured by the image sensor and an "after" image that has been processed through the system. The "after" image shows the critical area where details have been preserved while the rest of the image has been blurred. In this case, the system has recognized a person of interest and the critical area corresponds to the area of interest corresponding the recognized person's face. The video may also be altered such that a crop is used and focuses on the recognized person's face. In another example, another crop may be focused on many person of interest.

It is to be understood that the above-referenced arrangements are only illustrative of the application for the principles of the present disclosure. Numerous modifications and alternative arrangements can be devised without departing from the spirit and scope of the present disclosure. While the present disclosure has been shown in the drawings and fully described above with particularity and detail in connection with what is presently deemed to be the most practical and preferred example(s), it will be apparent to those of ordinary skill in the art that numerous modifications can be made without departing from the principles and concepts of the disclosure as set forth herein.

What is claimed is:

1. An image processing method, comprising:
   acquiring a video;
   using an object detection engine to detect a person in the video, the object detection engine being integrated with an image signal processing pipeline;
   using an encoder to compress the acquired video;
   modifying the behaviour of the encoder based on an output of the object detection engine;
   transmitting the compressed video over a network;
   determining, by analysing the acquired video prior to or during transmission of the compressed video over the network, that the detected person has moved less than a pre-set distance; and
   responsive to the determining, pausing the transmission of the compressed video over the network.

2. The method of claim 1, wherein the object detection engine is integrated with the image signal processing pipeline in an embedded image processor.

3. The method of claim 1, wherein the object detection engine receives raw digital video from an image sensor and analyses the raw digital video on a frame by frame basis.

4. The method of claim 1, wherein the object detection engine outputs data for each video frame describing:
   a pose of one or more detected persons;

a location or coordinates of the one or more detected persons; and a location or coordinates of at least one body part of the one or more detected persons.

5. The method of claim 1, comprising:

extracting a thumbnail image from the video, the thumbnail image comprising a face of the detected person; and sending a text alert to an end user, the text alert comprising the thumbnail, wherein the end user can choose to access a live video feed.

6. The method of claim 5, comprising sending the alert responsive to determining, based on pre-defined rules, that the detected person is not an allowed person.

7. The method of claim 1, wherein modifying the behaviour of the encoder comprises modifying one or more of:

compression ratio;
quantization;
output resolution; and
frame rate.

8. An embedded image processor comprising an object detection engine, the embedded image processor configured to:

acquire a video;

use the object detection engine to detect a person in the video, the object detection engine being integrated with an image signal processing pipeline;

use an encoder to compress the acquired video;

modify the behaviour of the encoder based on an output of the object detection engine;

transmit the compressed video over a network;

determine, by analysing the acquired video prior to or during transmission of the compressed video over the network, that the detected person has moved less than a pre-set distance; and responsive to the determining, pause the transmission of the compressed video over the network.

9. The embedded image processor of claim 8, wherein the object detection engine is integrated with the image signal processing pipeline in the embedded image processor.

10. The embedded image processor of claim 8, wherein the object detection engine receives raw digital video from an image sensor and analyses the raw digital video on a frame by frame basis.

11. The embedded image processor of claim 8, wherein the object detection engine outputs data for each video frame describing:

a pose of one or more detected persons;

a location or coordinates of the one or more detected persons; and a location or coordinates of at least one body part of the one or more detected persons.

12. The embedded image processor of claim 8, further configured to:

extract a thumbnail image from the video, the thumbnail image comprising a face of the detected person; and send a text alert to an end user, the text alert comprising the thumbnail, wherein the end user can choose to access a live video feed.

13. The embedded image processor of claim 12, further configured to send the alert responsive to determining, based on pre-defined rules, that the detected person is not an allowed person.

14. The embedded image processor of claim 8, wherein the object detection engine and the image signal processing pipeline:

are integrated with a graphics processing unit or a system on a chip; or form part of the graphics processing unit or the system on the chip.

15. The embedded image processor of claim 8, wherein modifying the behaviour of the encoder comprises modifying one or more of:

compression ratio;
quantization;
output resolution; and
frame rate.

* * * * *